US012638184B2

(12) United States Patent
Lao

(10) Patent No.: US 12,638,184 B2
(45) Date of Patent: May 26, 2026

(54) ENGINE FUEL INJECTORS WITH COMMON FUEL TARGET LOCATION

(71) Applicant: Pratt & Whitney Canada Corp., Longueuil (CA)

(72) Inventor: Si-Man Lao, Mississauga (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 18/899,889

(22) Filed: Sep. 27, 2024

(65) Prior Publication Data

US 2026/0092707 A1 Apr. 2, 2026

(51) Int. Cl.
*F23R 3/36* (2006.01)
*F02C 9/40* (2006.01)

(52) U.S. Cl.
CPC . *F23R 3/36* (2013.01); *F02C 9/40* (2013.01)

(58) Field of Classification Search
CPC ...... F23R 3/36; F23R 3/34; F02C 9/40; F23D 17/002
See application file for complete search history.

(56) References Cited

U.S. PATENT DOCUMENTS

| | | | | | |
|---|---|---|---|---|---|
| 5,263,314 | A | * | 11/1993 | Anderson | F02C 7/222 239/550 |
| 6,434,945 | B1 | * | 8/2002 | Mandai | F23R 3/36 60/39.463 |
| 8,011,187 | B2 | | 9/2011 | Sprouse | |
| 8,146,365 | B2 | | 4/2012 | Shum | |
| 10,731,861 | B2 | | 8/2020 | Schlein | |
| 11,506,390 | B2 | | 11/2022 | Snyder | |
| 11,525,403 | B2 | * | 12/2022 | Morenko | F23R 3/36 |
| 12,007,116 | B2 | | 6/2024 | Morenko | |
| 2012/0036855 | A1 | | 2/2012 | Hull | |
| 2014/0000274 | A1 | | 1/2014 | Srinivasan | |
| 2018/0100652 | A1 | | 4/2018 | Vranjic | |
| 2025/0198624 | A1 | | 6/2025 | Eggels | |

FOREIGN PATENT DOCUMENTS

| | | | | | |
|---|---|---|---|---|---|
| EP | | 4343206 | A1 | * | 3/2024 ............. F23R 3/283 |

OTHER PUBLICATIONS

EP Search Report for EP Patent Application No. 25205128.9 dated Feb. 2, 2026.

* cited by examiner

*Primary Examiner* — Katheryn A Malatek
(74) *Attorney, Agent, or Firm* — Getz Balich LLC

(57) ABSTRACT

A first fuel injector includes a first injector base, a first injector flange and a first gaseous fuel passage. The first injector flange is connected to the first injector base at a distal end of the first fuel injector. The first injector flange projects radially out from the first injector base to an outer rim of the first fuel injector. The first gaseous fuel passage includes a first passage upstream section and a first passage downstream section fluidly coupled to the first passage upstream section. The first passage upstream section extends axially within the first injector base. The first passage downstream section extends radially through the first injector flange to an outlet in the outer rim. A trajectory of the first gaseous fuel passage at the outlet is angularly offset from the first axis by a first acute offset angle.

20 Claims, 8 Drawing Sheets

ENGINE FUEL INJECTORS WITH COMMON FUEL TARGET LOCATION

TECHNICAL FIELD

This disclosure relates generally to an engine and, more particularly, to fuel injector(s) for the engine.

BACKGROUND INFORMATION

An engine such as a gas turbine engine may include multiple fuel injectors for injecting fuel into a combustion chamber. Various types and configurations of fuel injectors are known in the art. While these known fuel injectors have various benefits, there is still room in the art for improvement.

SUMMARY

According to an aspect of the present disclosure, an apparatus is provided for an engine. This engine apparatus includes a first fuel injector extending axially along a first axis to a distal end of the first fuel injector. The first fuel injector includes a first injector base, a first injector flange and a first gaseous fuel passage. The first injector flange is connected to the first injector base at the distal end of the first fuel injector. The first injector flange projects radially out from the first injector base to an outer rim of the first fuel injector. The first injector flange extends circumferentially around the first injector base. The first gaseous fuel passage includes a first passage upstream section and a first passage downstream section fluidly coupled to the first passage upstream section. The first passage upstream section extends axially within the first injector base. The first passage downstream section extends radially through the first injector flange to an outlet from the first gaseous fuel passage in the outer rim of the first fuel injector. A trajectory of the first gaseous fuel passage at the outlet from the first gaseous fuel passage is angularly offset from the first axis by a first acute offset angle.

According to another aspect of the present disclosure, another apparatus is provided for an engine. This engine apparatus includes a first fuel injector extending axially along a first axis to a distal end of the first fuel injector. The first fuel injector includes a first injector flange, a liquid fuel nozzle, a plurality of gaseous fuel passages and a plurality of air passages. The first injector flange projects radially out to an outer rim of the first fuel injector. The first injector flange circumscribes the liquid fuel nozzle. The gaseous fuel passages are arranged circumferentially about the first axis. Each of the gaseous fuel passages extends in the first fuel injector to a respective gaseous fuel passage outlet at the outer rim of the first fuel injector. A trajectory of each of the gaseous fuel passages at the respective gaseous fuel passage outlet points radially away from the first axis. The air passages are arranged circumferentially about the first axis. Each of the air passages extends through the first injector flange to a respective air passage outlet at the distal end of the first fuel injector. A trajectory of each of the air passages at the respective air passage outlet points radially towards the first axis.

According to still another aspect of the present disclosure, another apparatus is provided for an engine. This engine apparatus includes a combustor, a first fuel injector and a second fuel injector. The combustor includes an annular combustion chamber. The first fuel injector is disposed at a first injector location. The first fuel injector is configured to direct a first stream of gaseous fuel into the annular combustion chamber along a first trajectory towards a target location. The second fuel injector is disposed at a second injector location. The second fuel injector is configured to direct a second stream of the gaseous fuel into the annular combustion chamber along a second trajectory towards the target location. The second injector location is circumferentially spaced from the first injector location about a centerline of the annular combustion chamber.

The engine apparatus may also include a combustor and a second fuel injector. The combustor includes a combustion chamber. The second fuel injector may be circumferentially spaced from the first fuel injector about a centerline of the combustion chamber. The second fuel injector may include a second gaseous fuel passage extending within the second fuel injector to an outlet from the second gaseous fuel passage. A trajectory of the second gaseous fuel passage at the outlet from the second gaseous fuel passage may point to a target location within the combustion chamber. The trajectory of the first gaseous fuel passage at the outlet from the first gaseous fuel passage may also point to the target location within the combustion chamber.

The target location may be circumferentially aligned with a circumferential midpoint between the first fuel injector and the second fuel injector.

The second fuel injector may extend axially along a second axis to a distal end of the second fuel injector. The second fuel injector may also include a second injector base and a second injector flange. The second injector flange may be connected to the second injector base at the distal end of the second fuel injector. The second injector flange may project radially out from the second injector base to an outer rim of the second fuel injector. The second injector flange may extend circumferentially around the second injector base. The second gaseous fuel passage may include a second passage upstream section and a second passage downstream section fluidly coupled to the second passage upstream section. The second passage upstream section may extend axially within the second injector base. The second passage downstream section may extend radially through the second injector flange to the outlet from the second gaseous fuel passage in the outer rim of the second fuel injector. The trajectory of the second gaseous fuel passage at the outlet from the second gaseous fuel passage may be angularly offset from the second axis by a second acute offset angle.

The second acute offset angle may be equal to the first acute offset angle.

The engine apparatus may also include a gaseous fuel source configured to supply a gaseous fuel to the first fuel injector for flowing through the first gaseous fuel passage.

The gaseous fuel source may be configured as or otherwise include a hydrogen gas source. The gaseous fuel may be or otherwise include hydrogen ($H_2$) gas.

The first acute offset angle may be greater than twenty degrees.

The first fuel injector may also include a second gaseous fuel passage. The second gaseous fuel passage may include a second passage upstream section and a second passage downstream section fluidly coupled to the second passage upstream section. The second passage upstream section may extend axially within the first injector base. The second passage downstream section may extend radially through the first injector flange to an outlet from the second gaseous fuel passage in the outer rim of the first fuel injector. A trajectory of the second gaseous fuel passage at the outlet from the second gaseous fuel passage may be angularly offset from the first axis by a second acute offset angle.

The outlet from the first gaseous fuel passage may be disposed at a first location. The outlet from the second gaseous fuel passage may be disposed at a second location. The second location may be circumferentially spaced from the first location between one-hundred and ten degrees and one-hundred and eighty degrees about the first axis.

The outlet from the first gaseous fuel passage may be disposed at a first radial distance from the first axis. The outlet from the second gaseous fuel passage may be disposed at a second radial distance from the first axis that is equal to the first radial distance.

The second acute offset angle may be equal to the first acute offset angle.

The first fuel injector may also include a liquid fuel passage that extends axially in the first injector base to an outlet from the liquid fuel passage at the distal end of the first fuel injector.

The outlet from the liquid fuel passage may be coaxial with the first axis.

The first fuel injector may also include a plurality of air passages arranged circumferentially about the first axis. Each of the air passages may extend axially through the first injector flange to a respective air passage outlet at the distal end of the first fuel injector.

A trajectory of each of the air passages at the respective air passage outlet may be angularly offset from the first axis by a second acute offset angle.

The first fuel injector may also include an annular concave face surface at the distal end of the first fuel injector. The annular concave face surface may be at least partially formed by the first injector flange.

The engine apparatus may also include a compressor section, a combustor section including the first fuel injector, a turbine section and a flowpath. The flowpath may extend through the compressor section, the combustor section and the turbine section from an inlet into the flowpath to an exhaust from the flowpath.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
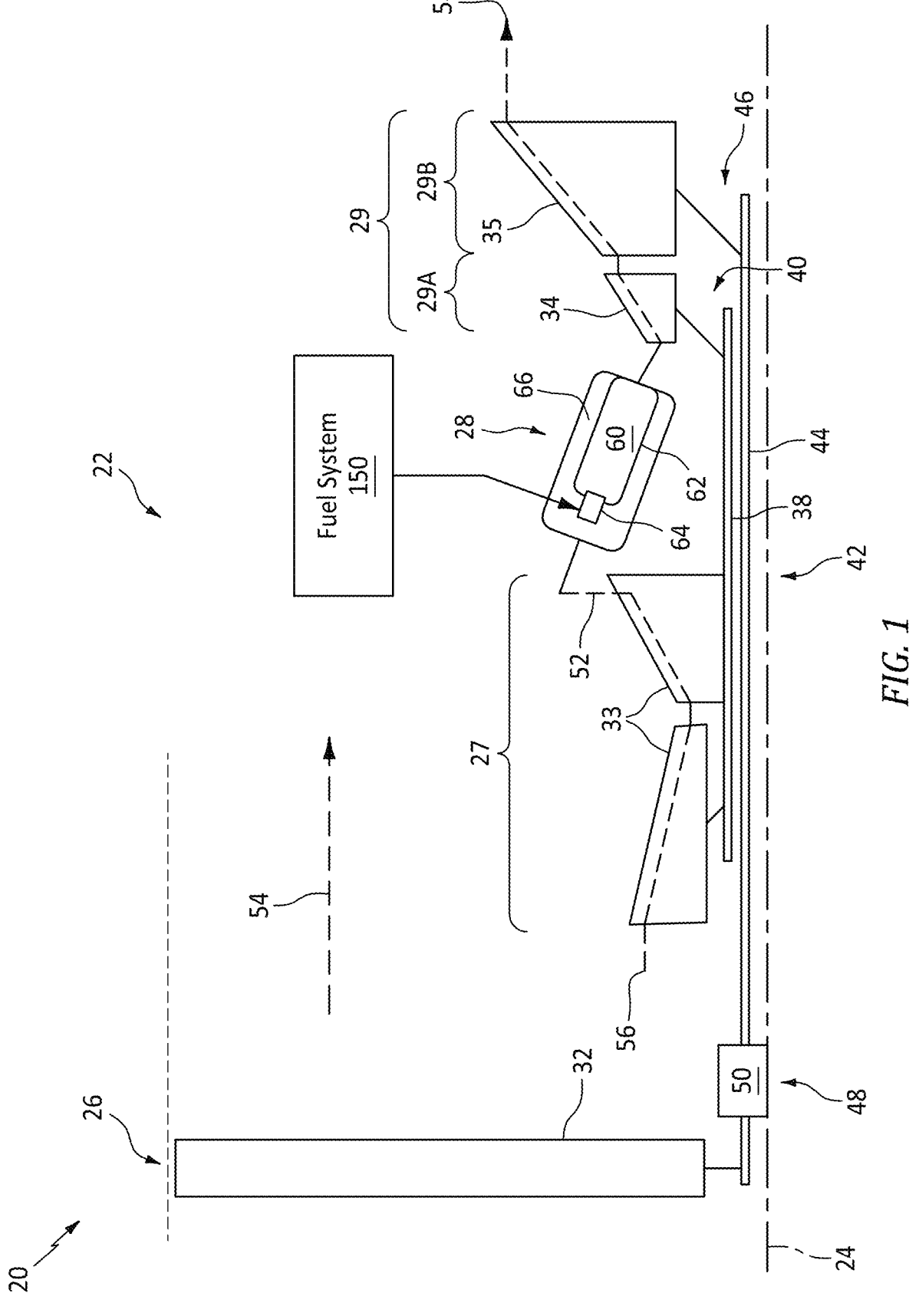
FIG. 1 is a partial schematic sectional illustration of an aircraft propulsion system.

FIG. 1 illustrates a propulsion system 20 for an aircraft with a gas turbine engine 22. The aircraft may be an airplane, a rotorcraft (e.g., a helicopter), a drone (e.g., an unmanned aerial vehicle (UAV)), or any other manned or unmanned aerial vehicle or system. For ease of description, the aircraft propulsion system 20 is described below as a turbofan propulsion system, and the turbine engine 22 is described below as a turbofan engine. The present disclosure, however, is not limited to such an exemplary aircraft propulsion system nor to such an exemplary turbine engine. The aircraft propulsion system 20, for example, may alternatively be configured as a turbojet propulsion system, a turboprop propulsion system, a turboshaft propulsion system or an open rotor propulsion system. Moreover, the present disclosure is not limited to propulsion system applications. The turbine engine 22, for example, may alternatively be configured as or included as part of an auxiliary power unit (APU) for the aircraft, a ground (e.g., industrial) electrical power system or a marine propulsion and/or electrical power system.

The turbine engine 22 of FIG. 1 extends axially along an engine axis 24 between a forward, upstream end of the turbine engine 22 and an aft, downstream end of the turbine engine 22. Briefly, the engine axis 24 may be a centerline axis of the turbine engine 22 and/or one or more of its members. The engine axis 24 may also or alternatively be a rotational axis for one or more members of the turbine engine 22. The turbine engine 22 of FIG. 1 includes a propulsor section 26 (e.g., a fan section), a compressor section 27, a combustor section 28 and a turbine section 29. The turbine section 29 of FIG. 1 includes a high pressure turbine (HPT) section 29A and a low pressure turbine (LPT) section 29B, which LPT section 29B may be a power turbine (PT) section dedicated to powering operation of the propulsor section 26.

The engine sections 26-29B may be arranged sequentially along the engine axis 24. The propulsor section 26 includes a bladed propulsor rotor 32; e.g., a fan rotor. The compressor section 27 includes a bladed compressor rotor 33. The HPT section 29A includes a bladed high pressure turbine (HPT) rotor 34. The LPT section 29B includes a bladed low pressure turbine (LPT) rotor 35, which LPT rotor 35 may be a power turbine (PT) rotor. The propulsor rotor 32, the compressor rotor 33, the HPT rotor 34 and the LPT rotor 35 each respectively include one or more arrays (e.g., stages) of rotor blades, where the rotor blades in each array are arranged circumferentially around and are connected to a respective rotor disk or hub. The rotor blades in each array, for example, may be formed integral with or mechanically fastened, welded, brazed and/or otherwise attached to the respective rotor disk and/or hub.

The compressor rotor 33 is coupled to and rotatable with the HPT rotor 34. The compressor rotor 33 of FIG. 1, for example, is connected to the HPT rotor 34 by a high speed shaft 38. At least (or only) the compressor rotor 33, the HPT rotor 34 and the high speed shaft 38 collectively form a high speed rotating assembly 40; e.g., a high speed spool of a core 42 of the turbine engine 22. Briefly, the engine core 42 of FIG. 1 includes the compressor section 27, the combustor section 28 and the turbine section 29.

The LPT rotor 35 of FIG. 1 is connected to a low speed shaft 44. At least (or only) the LPT rotor 35 and the low speed shaft 44 collectively form a low speed rotating assembly 46; e.g., a low speed spool of the engine core 42. This low speed rotating assembly 46 is further coupled to the propulsor rotor 32 through a drivetrain 48. This drivetrain 48 may be configured as a geared drivetrain, where a geartrain 50 (e.g., a transmission, a speed change device, an epicyclic geartrain, etc.) is disposed between and operatively couples the propulsor rotor 32 to the low speed rotating assembly 46 and its LPT rotor 35. With this arrangement, the propulsor rotor 32 may rotate at a different (e.g., slower) rotational speed than the low speed rotating assembly 46 and its LPT rotor 35. However, the drivetrain 48 may alternatively be configured as a direct drive drivetrain, where the geartrain 50 is omitted. With such an arrangement, the propulsor rotor 32 rotates at a common (the same) rotational speed as the low speed rotating assembly 46 and its LPT rotor 35. Each of the rotating assemblies 40 and 46 of FIG. 1 and its members as well as the propulsor rotor 32 may be rotatable about the engine axis 24. The present disclosure, however, is not limited to such an exemplary engine arrangement.

The turbine engine 22 of FIG. 1 includes a (e.g., annular) core flowpath 52 and a (e.g., annular) bypass flowpath 54. Here, the bypass flowpath 54 is a ducted flowpath within the aircraft propulsion system 20 and its turbine engine 22. The bypass flowpath 54, however, may alternatively be an open flowpath where the propulsor rotor 32 is alternatively configured as an un-ducted propulsor rotor; e.g., a propeller rotor, a rotorcraft rotor, an open rotor, etc. The core flowpath 52 of FIG. 1 extends within the turbine engine 22 and its engine core 42 from an airflow inlet 56 into the core flowpath 52 to a combustion products exhaust 58 from the core flowpath 52. More particularly, the core flowpath 52 extends from the core inlet 56, sequentially through the compressor section 27, the combustor section 28, the HPT section 29A and the LPT section 29B, to the core exhaust 58. The bypass flowpath 54 of FIG. 1 extends outside of the engine core 42 thereby bypassing the engine core 42 and its engine sections 27-29B.

During operation of the turbine engine 22 of FIG. 1, air is directed across the propulsor rotor 32 and into the engine core 42 through the core inlet 56. This air entering the core flowpath 52 may be referred to as core air. The core air is compressed by the compressor rotor 33 and directed into a combustion chamber 60 (e.g., an annular combustion chamber) within a combustor 62 (e.g., an annular combustor) of the combustor section 28. Fuel is injected into the combustion chamber 60 by one or more fuel injectors 64 and mixed with the compressed core air to provide a fuel-air mixture. This fuel-air mixture is ignited and combustion products thereof flow through and sequentially drive rotation of the HPT rotor 34 and the LPT rotor 35. The rotation of the HPT rotor 34 drives rotation of the compressor rotor 33 and, thus, the compression of the air received from the core inlet 56. The rotation of the LPT rotor 35 drives rotation of the propulsor rotor 32. The rotation of the propulsor rotor 32 of FIG. 1 propels some of the air flow thereacross (e.g., the air not entering the engine core 42) through the bypass flowpath 54 to provide engine thrust.

Figure 2:
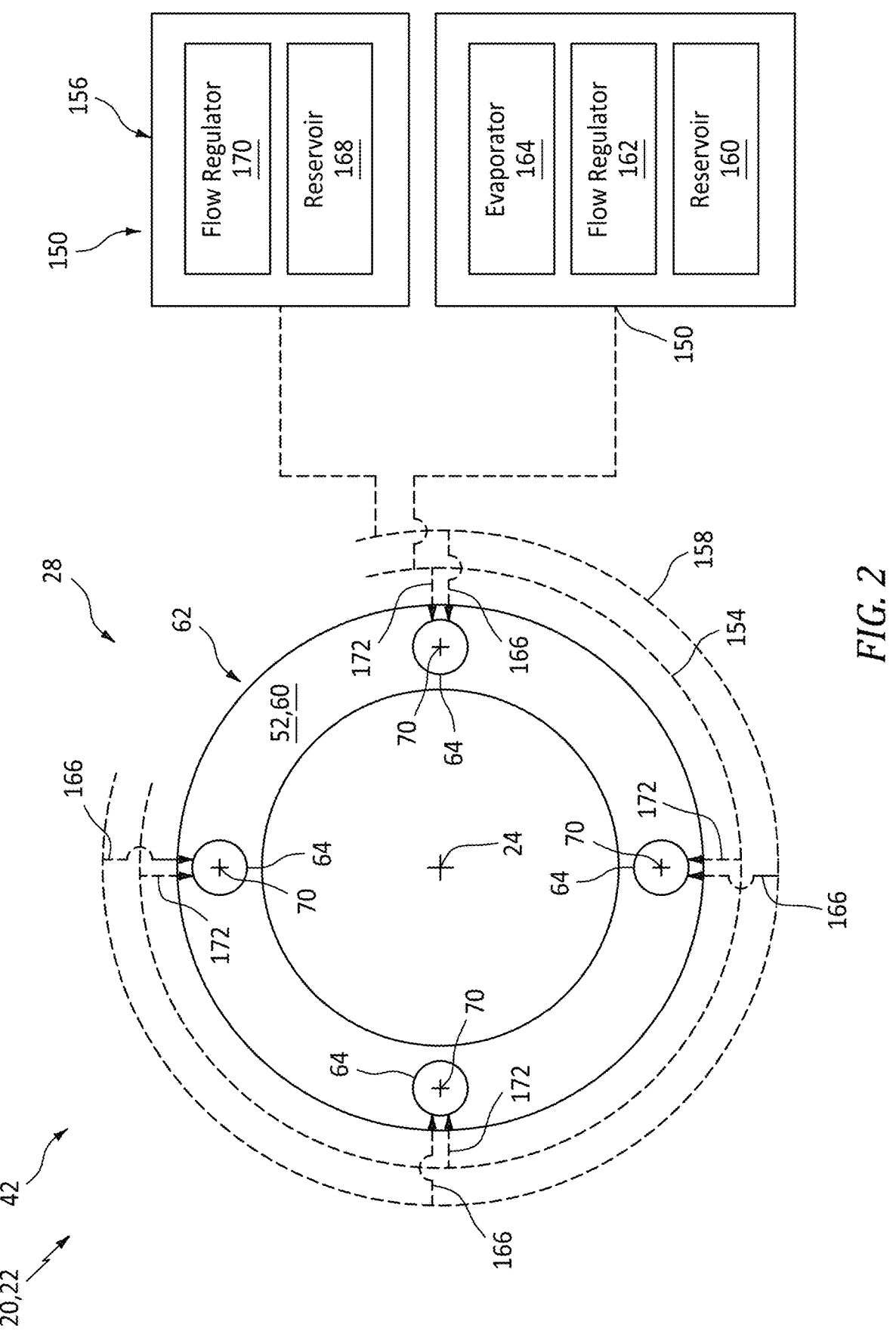
FIG. 2 is a partial schematic illustration of the aircraft propulsion system at a combustor section.
Figure 3:
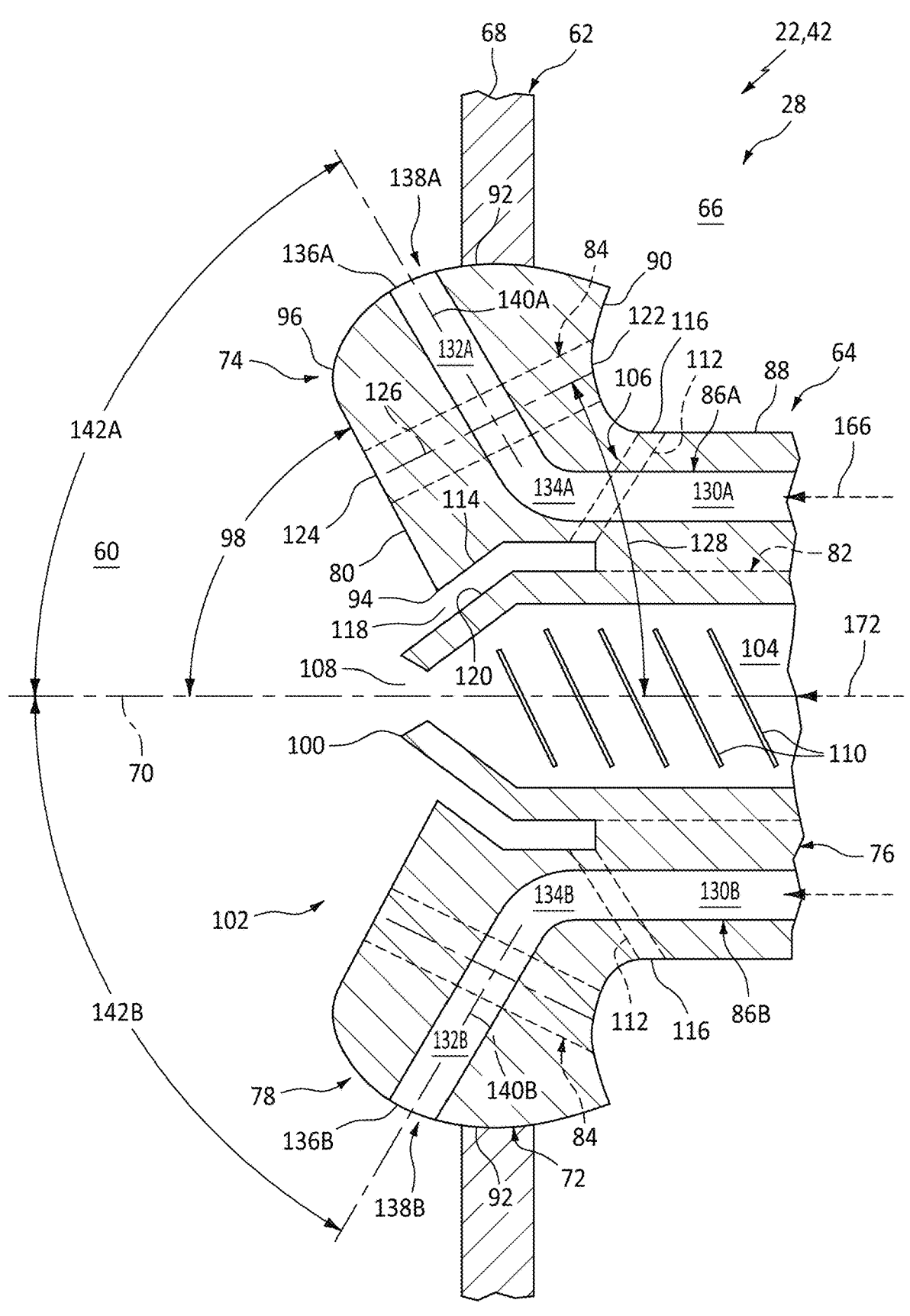
FIG. 3 is a partial schematic sectional illustration of a fuel injector at an interface with a combustor wall.

Referring to FIG. 2, the fuel injectors 64 are arranged and may be equispaced circumferentially about the engine axis 24 in an annular array; e.g., a circular array. Referring to FIG. 3, each of the fuel injectors 64 may extend across a diffuser plenum 66 surrounding the combustor 62 to a wall 68 of the combustor 62. Briefly, the combustor wall 68 may be a sidewall of the combustor 62 or a bulkhead wall of the combustor 62 depending on the specific combustor configuration and/or fuel injector placement. Each of the fuel injectors 64 is mated with the combustor wall 68. The fuel injector 64 of FIG. 3, for example, projects axially along an injector axis 70 through (or partially into) a port 72 in the combustor wall 68 to an axial distal end 74 (e.g., a tip, a face, etc.) of the fuel injector 64, which injector axis 70 may be a centerline axis of the respective fuel injector 64. The injector distal end 74 is thereby located within (or adjacent) the combustion chamber 60.

Each fuel injector 64 includes an injector base 76, an injector flange 78 and an injector face surface 80. Each fuel injector 64 also includes a liquid fuel nozzle 82, one or more outer air passages 84 and one or more gaseous fuel passages 86A and 86B (generally referred to as "86"); e.g., a pair of the gaseous fuel passages 86. With such an arrangement, each fuel injector 64 may be configured as a multi fuel-fuel injector; e.g., a dual fuel-fuel injector. However, it is contemplated one or more or all of the fuel injectors 64 may alternatively each be configured as a single fuel-fuel injector without, for example, the liquid fuel nozzle 82 or without a combination of the liquid fuel nozzle 82 and the outer air passages 84.

The injector base 76 extends axially along the injector axis 70 to the injector face surface 80. The injector base 76 projects radially out to a radial outer side 88 of the injector base 76. The base outer side 88 may have a cylindrical geometry. The base outer side 88 extends circumferentially around the injector axis 70, providing the base outer side 88 with a full-hoop (e.g., tubular) geometry.

The injector flange 78 is connected to the injector base 76. The injector flange 78 is disposed at (e.g., on, adjacent or proximate) the injector distal end 74. The injector flange 78 of FIG. 3, for example, extends axially along the injector base 76 and the injector axis 70 from an upstream side 90 of the injector flange 78 to the injector face surface 80 and the injector distal end 74. The injector flange 78 projects radially out from the injector base 76 and its base outer side 88 to a radial outer rim 92 of the respective fuel injector 64; e.g., a radial outer distal end of the injector flange 78. The injector outer rim 92 may have a curved (e.g., arcuate, partially circular, partially elliptical, etc.) convex sectional geometry when viewed, for example, in a first reference plane parallel with (e.g., including) the respective injector axis 70. The injector flange 78 and the injector outer rim 92 extend circumferentially around the injector axis 70, providing the injector flange 78 and the injector outer rim 92 each with a full-hoop (e.g., annular) geometry. The injector flange 78 also circumscribes the injector base 76 at the injector distal end 74.

The injector face surface 80 is disposed at the injector distal end 74. The injector face surface 80 of FIG. 3 is formed collectively by the injector base 76 and the injector flange 78. The injector face surface 80 may be configured as an annular concave face surface. The injector face surface 80 of FIG. 3, for example, extends radially from a radial inner edge 94 of the injector face surface 80 to a radial outer edge 96 of the injector face surface 80. The face surface outer edge 96 is axially aligned with the injector distal end 74, whereas the face surface inner edge 94 is axially recessed into the respective fuel injector 64 from the face surface outer edge 96. With this arrangement, the injector face surface 80 is angularly offset from the injector axis 70 by an offset angle 98 when viewed, for example, in the first reference plane. This face surface offset angle 98 may be a non-zero acute angle equal to or greater than thirty degrees (30°); e.g., between forty-five degrees (45°) and eighty degrees (80°) inclusive. Here, the injector face surface 80 tapers radially inward as the injector face surface 80 extends away from its face surface outer edge 96 towards its face surface inner edge 94. The injector face surface 80 extends circumferentially around the injector axis 70, providing the injector face surface 80 with a full-hoop (e.g., annular, frustoconical) geometry. The injector face surface 80 may thereby circumscribe a tip 100 of the liquid fuel nozzle 82.

The injector face surface 80 of FIG. 3 forms a pocket 102 in the fuel injector 64 at its injector distal end 74. This pocket 102 projects axially along the injector axis 70 into the fuel injector 64 from the face surface outer edge 96 to the face surface inner edge 94. The pocket 102 extends radially within the respective fuel injector 64 between diametrically opposing sides of the injector face surface 80. The pocket 102 also extends within the respective fuel injector 64 circumferentially about (e.g., completely around) the injector axis 70.

The liquid fuel nozzle 82 of FIG. 3 is integrated into and partially forms the injector base 76. This liquid fuel nozzle 82 includes a liquid fuel passage 104 and an inner air circuit 106.

The liquid fuel passage 104 extends axially in the injector base 76 and its liquid fuel nozzle 82 to an outlet 108 from the liquid fuel passage 104 at the nozzle tip 100/at or about the injector distal end 74. The liquid fuel passage 104 and/or its liquid passage outlet 108 may be coaxial with the respective injector axis 70. The liquid fuel passage 104 may thereby be a central bore in the respective fuel injector 64, and the liquid passage outlet 108 may be a central outlet in the respective fuel injector 64 at the injector distal end 74. In some embodiments, the liquid fuel passage 104 may be configured with one or more internal fuel swirlers 110 for swirling liquid fuel directed through the liquid fuel passage 104 to its liquid passage outlet 108.

Figure 4:
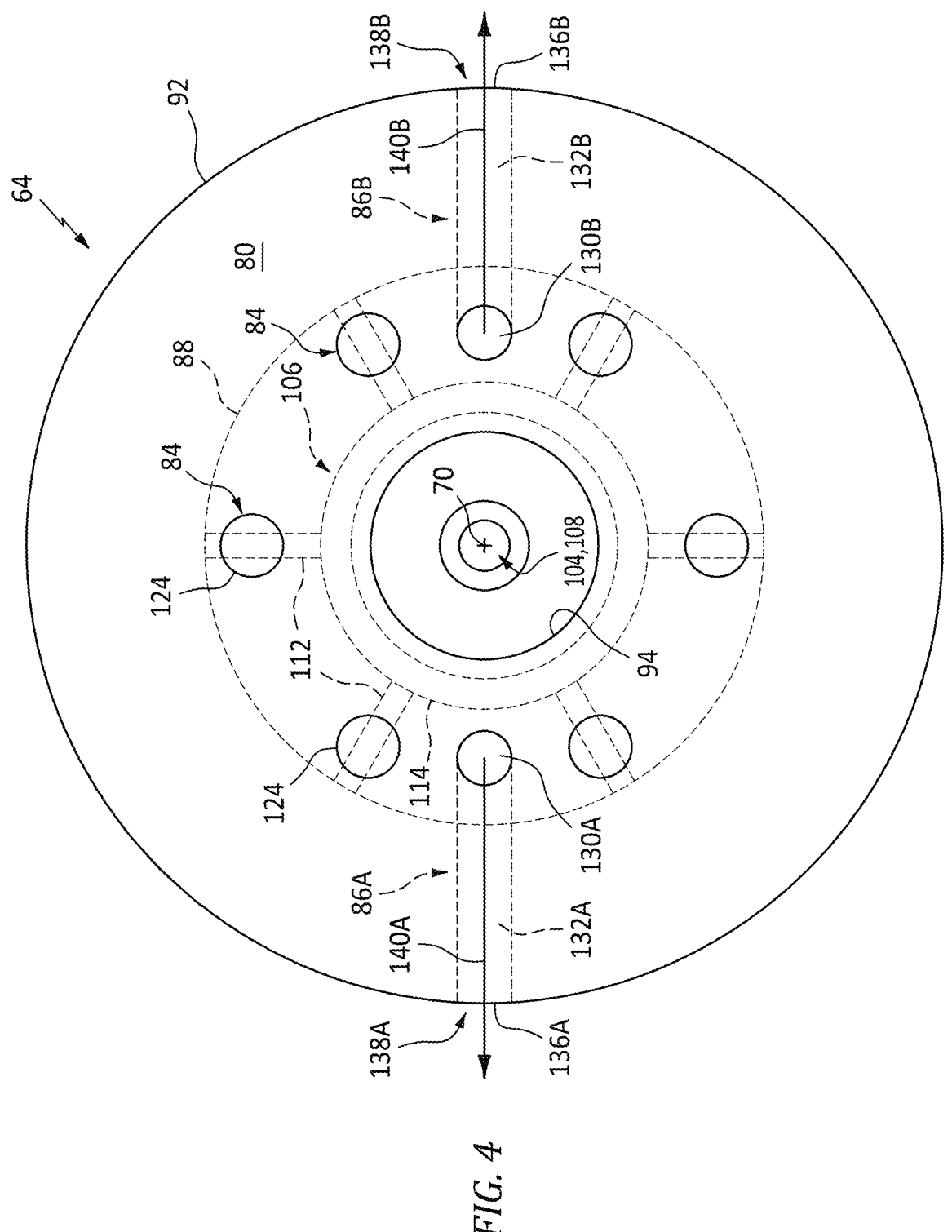
FIG. 4 is an end view illustration of the fuel injector.

The inner air circuit 106 of FIG. 3 includes one or more inner air passages 112 and an inner air annulus 114. Referring to FIG. 4, the inner air passages 112 are arranged and may be equispaced circumferentially about the injector axis 70 in an annular array; e.g., a circular array. Referring to FIG. 3, each of the inner air passages 112 projects radially into the respective fuel injector 64 to the inner air annulus 114. Each inner air passage 112 of FIG. 3, for example, projects radially into the injector base 76 from an inlet 116 into the respective inner air passage 112 to (or about) an upstream end of the inner air annulus 114, where the inner air passage inlet 116 is disposed in the base outer side 88. Each of the inner air passages 112 of FIG. 3 thereby fluidly couples the diffuser plenum 66 (or another compressed air source) to the inner air annulus 114. Note, while each inner air passage 112 of FIG. 3 is shown with an axial and a radial component to its centerline trajectory, the centerline trajectory may (or may not) also include a circumferential component. The inner air annulus 114 extends axially within the injector base 76 to an annular outlet 118 from the inner air annulus 114 at the nozzle tip 100/at or about the injector distal end 74. The inner air outlet 118 of FIG. 3, for example, is radially between and formed by the face surface inner edge 94 and a tapered (e.g., frustoconical) surface 120 of the liquid fuel nozzle 82 at the nozzle tip 100. Here, a downstream section of the inner air annulus 114 adjacent and upstream of the inner air outlet 118 radially tapers as the inner air annulus 114 extends axially to its inner air outlet 118. The inner air annulus 114 of FIG. 3 thereby fluidly couples the inner air passages 112 to the combustion chamber 60.

Referring to FIG. 4, the outer air passages 84 are arranged and may be equispaced circumferentially about the injector axis 70. Referring to FIG. 3, each of the outer air passages 84 projects axially and radially inward through the respective fuel injector 64 and its members 76 and 78 from an inlet 122 into the respective outer air passage 84 to an outlet 124 from the outer air passage 84. The outer air passage inlet 122 of FIG. 3 is disposed in the flange upstream side 90. The outer air passage outlet 124 of FIG. 3 is disposed in the injector face surface 80 at the injector distal end 74. The outer air passages 84 of FIG. 3 thereby fluidly couple the diffuser plenum 66 (or another compressed air source) to the combustion chamber 60.

A trajectory 126 of each outer air passage 84 at least at its respective outer air passage outlet 124 is angularly offset from the respective injector axis 70 by an offset angle 128 when viewed, for example, in the first reference plane. This outer air passage offset angle 128 may be a non-zero acute angle equal to or less than eighty degrees (80°); e.g., between twenty degrees (20°) and forty-five degrees (45°) inclusive, or between forty-five degrees (45°) and seventy degrees (70°) inclusive. Here, the outer air passage trajectory 126 points radially inwards towards the respective injector axis 70, at least when viewed in the first reference plane. In some embodiments, the outer air passage trajectory 126 may be coincident with the respective injector axis 70. In other embodiments, the outer air passage trajectory 126 may be non-coincident with the respective injector axis 70 in order to promote air swirling and fuel mixing.

Each gaseous fuel passage 86A, 86B includes an upstream section 130A, 130B (generally referred to as "130") and a downstream section 132A, 132B (generally referred to as "132") that is fluidly coupled with the upstream section 130A, 130B at a bend 134A, 134B (generally referred to as "134") in the respective gaseous fuel passage 86A, 86B. The upstream section 130 of FIG. 3 extends axially within the respective fuel injector 64 and its injector base 76, in an axial direction towards the injector distal end 74, to the downstream section 132. The downstream section 132A, 132B of FIG. 3 projects radially out of the injector base 76 and through the injector flange 78 to an outlet 136A, 136B (generally referred to as "136") from the respective gaseous fuel passage 86A, 86B. This gaseous passage outlet 136A, 136B is disposed in the injector outer rim 92 at a respective outlet location 138A, 138B (generally referred to as "138"). Referring to FIG. 4, where the respective fuel injector 64 is configured with two of the gaseous fuel passages 86 and, thus, two of the gaseous passage outlets 136, the outlet locations 138 may be circumferentially spaced apart about the respective injector axis 70 by between (a) one-hundred and ten degrees (110°) or one-hundred and fifty degrees (150°) and (b) one-hundred and eighty degrees (180°) inclusive. Note, the inter-outlet angle may be selected to facilitate fuel/flame interactions between circumferentially adjacent fuel injectors 64 as described below in further detail. In some embodiments, up to and including six (6) of the gaseous fuel passages 86 may be provided and arranged around the respective injector axis 70.

Referring to FIG. 3, a trajectory 140A, 140B (generally referred to as "140") of each gaseous fuel passage 86A, 86B at least at its respective gaseous passage outlet 136A, 136B is angularly offset from the respective injector axis 70 by an offset angle 142A, 142B (generally referred to as "142") when viewed, for example, in the first reference plane. This gaseous passage offset angle 142 may be a non-zero acute angle equal to or greater than twenty degrees (20°); e.g., between thirty degrees (30°) and forty-five degrees (45°) inclusive, or between forty-five degrees (45°) and seventy degrees (70°) inclusive, or greater than seventy degrees (70°) and less than ninety degrees (90°). Here, the gaseous passage trajectory 140 points radially away from the respective injector axis 70, at least when viewed in the first reference plane. More particularly, referring to FIG. 5, the gaseous passage trajectory 140 points to a respective target location 144 within the combustion chamber 60. In the arrangement of FIG. 3, the first gaseous passage offset angle 142A is equal to the second gaseous passage offset angle 142B. However, in other embodiments, it is contemplated the first gaseous passage offset angle 142A may be different than the second gaseous passage offset angle 142B. Moreover, in the arrangement of FIG. 3, a first radial distance from the respective injector axis 70 to the first gaseous passage outlet 136A is equal to a second radial distance from the respective injector axis 70 to the first gaseous passage outlet 136A. However, in other embodiments, it is contemplated the first radial distance may be different than the second radial distance.

Figure 5:
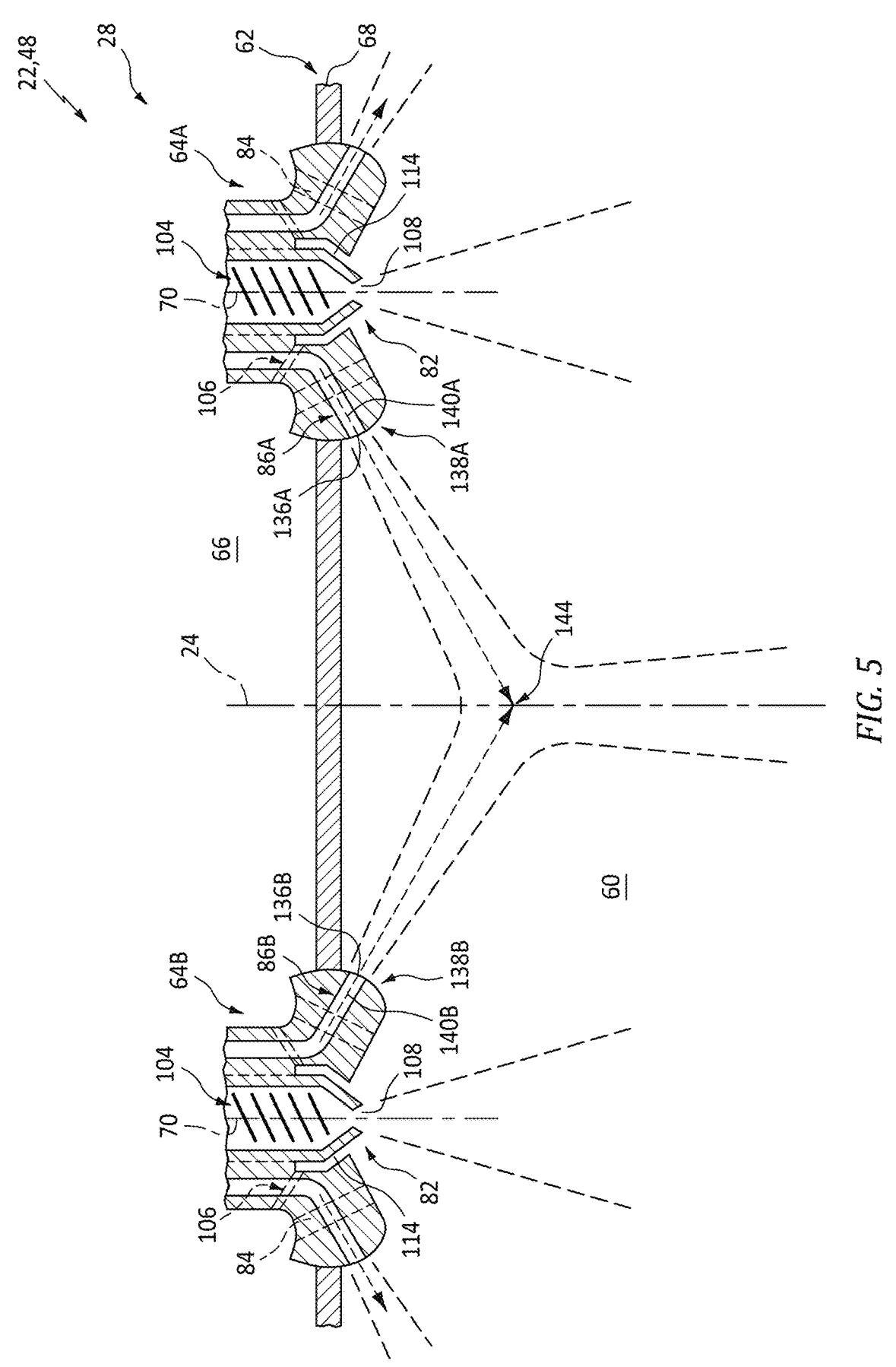
FIG. 5 is a partial schematic sectional illustration of circumferentially neighboring fuel injectors along the combustor wall.
Figure 6:
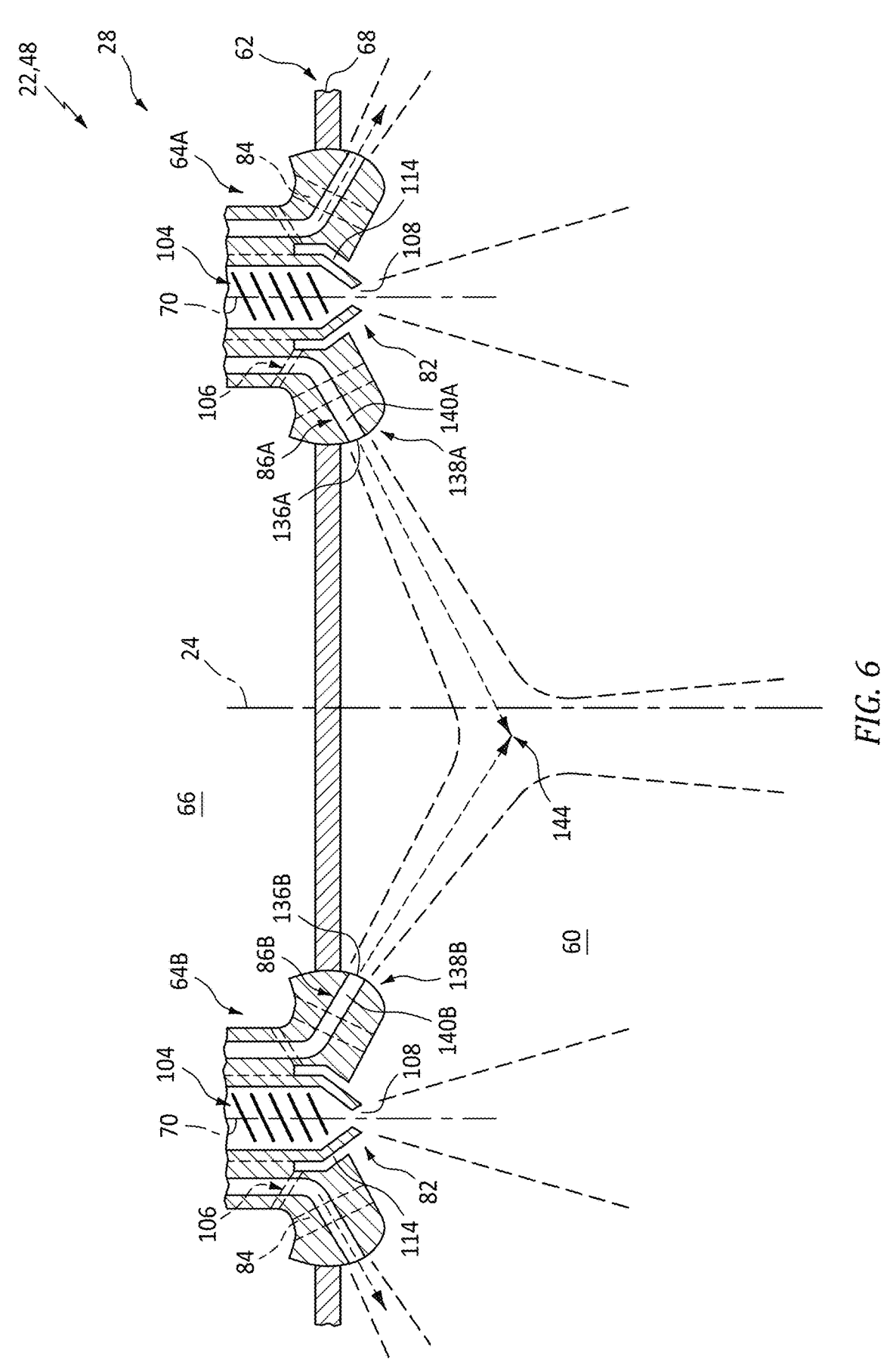
FIG. 6 is a partial schematic sectional illustration of the circumferentially neighboring fuel injectors along the combustor wall with another gaseous fuel passage arrangement.

Referring to FIG. 5, the target location 144 is disposed within the combustion chamber 60 circumferentially between a respective circumferentially neighboring (e.g., adjacent) pair of the fuel injectors 64. This target location 144 of FIG. 5 is aligned with a circumferential midpoint between the neighboring pair of the fuel injectors 64. The target location 144 of FIG. 5 is thereby located equal circumferential distances about the engine axis 24 to the fuel injector 64A and the fuel injector 64B. Alternatively, referring to FIG. 6, the target location 144 may be asymmetrically arranged circumferentially between the neighboring pair of the fuel injectors 64. The target location 144 of FIG. 6, for example, is located circumferentially closer to the fuel injector 64B than the fuel injector 64A about the engine axis 24.

Figures 7A, 7B, 7C:
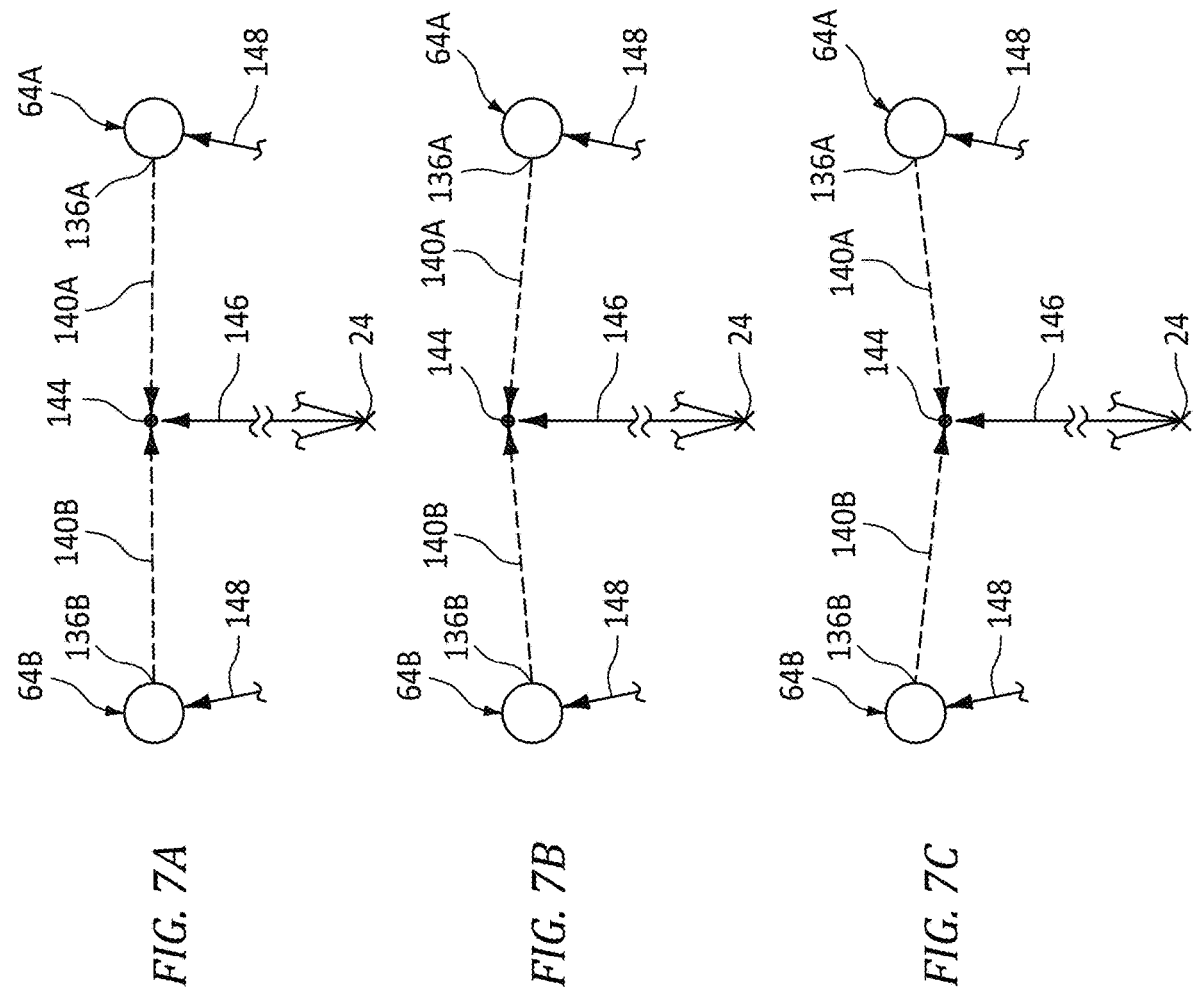
FIGS. 7A-C are schematic illustrations of various target locations relative to the circumferentially neighboring fuel injectors.

Referring to FIGS. 7A-C, the target location 144 is located a radial distance 146 from the engine axis 24. Each gaseous passage outlet 136 is located a radial distance 148 from the engine axis 24. In some embodiments, referring to FIG. 7A, the target location distance 146 may be equal to one or both of the outlet distances 148. In other embodiments, referring to FIG. 7B, the target location distance 146 may be greater than one or both of the outlet distances 148. In still other embodiments, referring to FIG. 7C, the target location 144 distance may be less than one or both of the outlet distances 148.

Referring to FIG. 2, the aircraft propulsion system 20 includes a fuel system 150 configured to deliver gaseous fuel and the liquid fuel to the fuel injectors 64 for injection into the combustion chamber 60. For ease of description, the gaseous fuel is described below as a gaseous hydrogen fuel; e.g., hydrogen ($H_2$) gas. The gaseous fuel, however, may alternatively be another gaseous fuel such as, but not limited to, gaseous methane (e.g., natural gas), propane gas or the like. For ease of description, the liquid fuel is described below as liquid kerosene; e.g., liquid Jet-A fuel. The liquid fuel, however, may alternatively be another liquid fuel such as, but not limited to, diesel, sustainable aviation fuel (SAF) or the like. The fuel system 150 of FIG. 2 includes a gaseous fuel source 152, a gaseous fuel manifold 154, a liquid fuel source 156 and a liquid fuel manifold 158.

The gaseous fuel source 152 of FIG. 2 includes a fuel reservoir 160, a fuel flow regulator 162 and a fuel evaporator 164. The fuel reservoir 160 is configured to store a quantity of fuel (e.g., in its liquid phase) before, during and/or after aircraft powerplant operation. The fuel reservoir 160, for example, may be configured as or otherwise include a tank, a cylinder, a pressure vessel, a bladder or any other type of (e.g., insulated) fuel storage container. The fuel flow regulator 162 is configured to direct a flow of the fuel (e.g., in its liquid phase) from the fuel reservoir 160 to the fuel evaporator 164. The fuel flow regulator 162, for example, may be configured as or otherwise include a fuel compressor, a fuel pump and/or a fuel valve (or valve system). The fuel evaporator 164 is configured to facilitate evaporation of the fuel from its liquid phase to a gaseous phase so as to output the gaseous fuel from an outlet of the gaseous fuel source 152. This fuel source outlet may be fluidly coupled to each of the fuel injectors 64 and their sequentially through the gaseous fuel manifold 154 and a respective gaseous fuel feed passage 166. Referring to FIG. 3, each gaseous fuel feed passage 166 may be fluidly coupled, in parallel, to the gaseous fuel passages 86 of a respective one of the fuel injectors 64, for example, through an intermediate gaseous fuel plenum (e.g., an annular chamber, a gallery, etc.) within the respective fuel injector 64.

The liquid fuel source 156 of FIG. 2 includes a fuel reservoir 168 and a fuel flow regulator 170. The fuel reservoir 168 is configured to store a quantity of the liquid fuel before, during and/or after aircraft powerplant operation. The fuel reservoir 168, for example, may be configured as or otherwise include a tank, a cylinder, a pressure vessel, a bladder or any other type of fuel storage container. The fuel flow regulator 170 is configured to direct a flow of the liquid fuel from the fuel reservoir 168 to an outlet of the liquid fuel source 156. The fuel flow regulator 170, for example, may be configured as or otherwise include a fuel pump and/or a fuel valve (or valve system). The fuel source outlet may be fluidly coupled to each of the fuel injectors 64 sequentially through the liquid fuel manifold 158 and a respective liquid fuel feed passage 172. Referring to FIG. 3, each liquid fuel feed passage 172 is fluidly coupled to the liquid fuel passage 104 of a respective one of the fuel injectors 64.

For ease of description, each fuel injector 64 of FIG. 5 is described below as concurrently receiving both the gaseous fuel and the liquid fuel. However, in other embodiments, each fuel injector 64 may receive the gaseous fuel without receiving the liquid fuel. In still other embodiments, each fuel injector 64 may receive the liquid fuel without receiving the gaseous fuel.

Referring still to FIG. 5, the gaseous fuel is directed through each of the gaseous fuel passages 86 within the respective fuel injector 64 for injection into the combustion chamber 60. More particularly, each gaseous fuel passage 86 within the respective fuel injector 64 directs a stream (e.g., a jet) of the gaseous fuel out of the respective fuel injector 64 via the respective gaseous passage outlet 136 and into the combustion chamber 60. Each stream of the gaseous fuel may be ignited within the combustion chamber 60 such that a gaseous fuel flame extends longitudinally away from the respective fuel injector 64 along the respective gaseous passage trajectory 140 to the respective target location 144. At the target location 144, multiple (e.g., two) gaseous fuel flames collide. This collision reduces an overall velocity of the respective gaseous fuel flames and redirects the respective gaseous fuel flames (e.g., as a combined gaseous fuel flame) substantially axially along the engine axis 24. The collision may also promote mixing between the multiple streams of unignited gaseous fuel as well as mixing between the unignited gaseous fuel and the compressed core air directed into the combustion chamber 60 from the diffuser plenum 66 (see FIG. 2). The gaseous fuel may thereby be injected into the combustion chamber 60 at a relatively high pressure without extending a mixing and combustion region too axially deep into the combustion chamber 60. At the same time, each target location 144 may be selected to be axially deep enough into the combustion chamber 60 to reduce or prevent flashback and/or flame holding.

Concurrent with the injection of the gaseous fuel, each fuel injector 64 of FIG. 5 also injects (e.g., sprays) the liquid fuel into the combustion chamber 60. Compressed air directed into the combustion chamber 60 from the inner air annulus 114 and the outer air passages 84 may facilitate atomization and/or mixing of the liquid fuel.

Figure 8B:
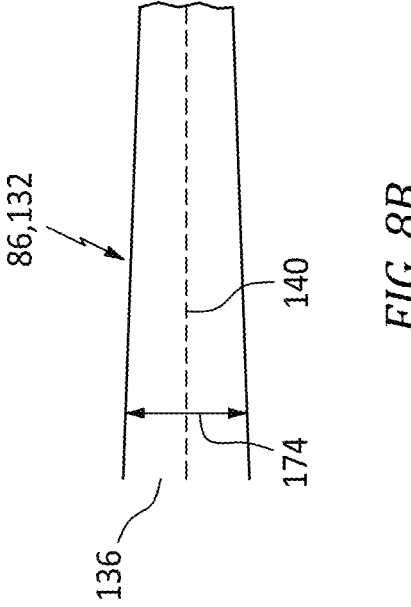
FIGS. 8A and 8B are partial schematic illustrations of various gaseous fuel passage arrangements.
Figure 8A:
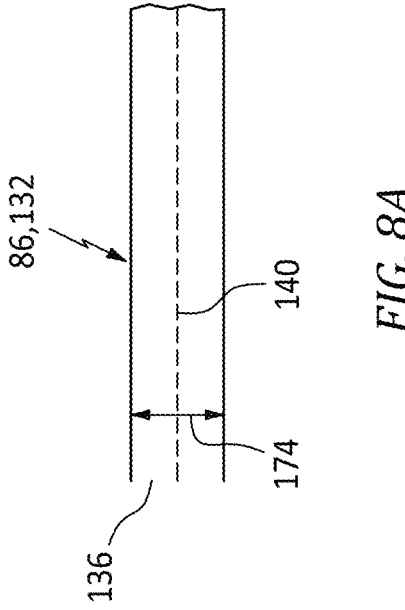

Referring to FIGS. 8A and 8B, each gaseous fuel passage 86 has a lateral size 174 (e.g., a width, a diameter, etc.) measured perpendicular to its gaseous passage trajectory 140. Referring to FIG. 8A, the gaseous passage size 174 may be uniform (e.g., constant, the same) at least longitudinally along the respective downstream section 132. Alternatively, referring to FIG. 8B, the gaseous passage size 174 may change (e.g., increase) as the respective downstream section 132 extends longitudinally to its gaseous passage outlet 136. With such an arrangement, the respective downstream section 132 may laterally diverge to (or towards) the respective gaseous passage outlet 136.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An apparatus for an engine, comprising:
a first fuel injector extending axially along a first axis to a distal end of the first fuel injector, the first fuel injector including a first injector base, a first injector flange and a first gaseous fuel passage;
the first injector flange connected to the first injector base at the distal end of the first fuel injector, the first injector flange projecting radially out from the first injector base to an outer rim of the first fuel injector, and the first injector flange extending circumferentially around the first injector base; and
the first gaseous fuel passage including a first passage upstream section and a first passage downstream section fluidly coupled to the first passage upstream section, the first passage upstream section extending axially within the first injector base, the first passage downstream section extending radially through the first injector flange to an outlet from the first gaseous fuel passage in the outer rim of the first fuel injector, and a trajectory of the first gaseous fuel passage at the outlet from the first gaseous fuel passage angularly offset from the first axis by a first acute offset angle; and
wherein a diameter of the first passage downstream section increases as the first passage downstream section extends to the outlet.

2. The apparatus of claim 1, further comprising:
a combustor comprising a combustion chamber; and
a second fuel injector circumferentially spaced from the first fuel injector about a centerline of the combustion chamber, the second fuel injector comprising a second gaseous fuel passage extending within the second fuel injector to an outlet from the second gaseous fuel passage, and a trajectory of the second gaseous fuel passage at the outlet from the second gaseous fuel passage pointing to a target location within the combustion chamber;

the trajectory of the first gaseous fuel passage at the outlet from the first gaseous fuel passage further pointing to the target location within the combustion chamber.

3. The apparatus of claim 2, wherein the target location is circumferentially aligned with a circumferential midpoint between the first fuel injector and the second fuel injector.

4. The apparatus of claim 2, wherein
the second fuel injector extends axially along a second axis to a distal end of the second fuel injector, and the second fuel injector further comprises a second injector base and a second injector flange;
the second injector flange is connected to the second injector base at the distal end of the second fuel injector, the second injector flange projects radially out from the second injector base to an outer rim of the second fuel injector, and the second injector flange extends circumferentially around the second injector base; and
the second gaseous fuel passage includes a second passage upstream section and a second passage downstream section fluidly coupled to the second passage upstream section, the second passage upstream section extends axially within the second injector base, the second passage downstream section extends radially through the second injector flange to the outlet from the second gaseous fuel passage in the outer rim of the second fuel injector, and the trajectory of the second gaseous fuel passage at the outlet from the second gaseous fuel passage is angularly offset from the second axis by a second acute offset angle.

5. The apparatus of claim 4, wherein the second acute offset angle is equal to the first acute offset angle.

6. The apparatus of claim 1, further comprising a gaseous fuel source configured to supply a gaseous fuel to the first fuel injector for flowing through the first gaseous fuel passage.

7. The apparatus of claim 6, wherein the gaseous fuel source comprises a hydrogen gas source, and the gaseous fuel comprises hydrogen (H2) gas.

8. The apparatus of claim 1, wherein the first acute offset angle is greater than twenty degrees.

9. The apparatus of claim 1, wherein
the first fuel injector further includes a second gaseous fuel passage;
the second gaseous fuel passage includes a second passage upstream section and a second passage downstream section fluidly coupled to the second passage upstream section;
the second passage upstream section extends axially within the first injector base;
the second passage downstream section extends radially through the first injector flange to an outlet from the second gaseous fuel passage in the outer rim of the first fuel injector; and
a trajectory of the second gaseous fuel passage at the outlet from the second gaseous fuel passage is angularly offset from the first axis by a second acute offset angle.

10. The apparatus of claim 9, wherein
the outlet from the first gaseous fuel passage is disposed at a first location;
the outlet from the second gaseous fuel passage is disposed at a second location; and
the second location is circumferentially spaced from the first location between one-hundred and ten degrees and one-hundred and eighty degrees about the first axis.

11. The apparatus of claim 9, wherein the outlet from the first gaseous fuel passage is disposed at a first radial distance from the first axis; and the outlet from the second gaseous fuel passage is disposed at a second radial distance from the first axis that is equal to the first radial distance.

12. The apparatus of claim 9, wherein the second acute offset angle is equal to the first acute offset angle.

13. The apparatus of claim 1, wherein the first fuel injector further includes a liquid fuel passage that extends axially in the first injector base to an outlet from the liquid fuel passage at the distal end of the first fuel injector.

14. The apparatus of claim 13, wherein the outlet from the liquid fuel passage is coaxial with the first axis.

15. The apparatus of claim 13, wherein the first fuel injector further includes a plurality of air passages arranged circumferentially about the first axis; and each of the plurality of air passages extends axially through the first injector flange to a respective air passage outlet at the distal end of the first fuel injector.

16. The apparatus of claim 15, wherein a trajectory of each of the plurality of air passages at the respective air passage outlet is angularly offset from the first axis by a second acute offset angle.

17. The apparatus of claim 1, wherein the first fuel injector further includes an annular concave face surface at the distal end of the first fuel injector, and the annular concave face surface is at least partially formed by the first injector flange.

18. The apparatus of claim 1, further comprising:

a compressor section;

a combustor section comprising the first fuel injector;

a turbine section; and a flowpath extending through the compressor section, the combustor section and the turbine section from an inlet into the flowpath to an exhaust from the flowpath.

19. An apparatus for an engine, comprising:

a first fuel injector extending axially along a first axis to a distal end of the first fuel injector, the first fuel injector including a first injector flange, a liquid fuel nozzle, a plurality of gaseous fuel passages and an inner air circuit, and the inner air circuit comprises a plurality of air passages and an inner air annulus;

the first injector flange projecting radially out to an outer rim of the first fuel injector, and the first injector flange circumscribing the liquid fuel nozzle;

the plurality of gaseous fuel passages arranged circumferentially about the first axis, each of the plurality of gaseous fuel passages extending in the first fuel injector to a respective gaseous fuel passage outlet at the outer rim of the first fuel injector, and a trajectory of each of the plurality of gaseous fuel passages at the respective gaseous fuel passage outlet pointing radially away from the first axis;

the plurality of air passages arranged circumferentially about the first axis, each of the plurality of air passages extending through the first injector flange to an upstream end of the inner air annulus, and a trajectory of each of the plurality of air passages extending to the inner air annulus pointing radially towards the first axis; and the inner air annulus extending axially within first fuel injector to an air passage outlet at the distal end of the first fuel injector, a downstream section of the inner air annulus adjacent and upstream of the air passage outlet radially tapering as the inner air annulus extends axially to the air passage outlet.

20. An apparatus for an engine, comprising:

a combustor comprising an annular combustion chamber extending circumferentially about an engine axis;

a first fuel injector disposed at a first injector location, the first fuel injector configured to direct a first stream of gaseous fuel into the annular combustion chamber along a first trajectory towards a target location;

a second fuel injector disposed at a second injector location, the second fuel injector configured to direct a second stream of the gaseous fuel into the annular combustion chamber along a second trajectory towards the target location, and the second injector location circumferentially spaced from the first injector location about a centerline of the annular combustion chamber;

wherein the target location is located a first radial distance from the engine axis;

wherein a first gaseous outlet of the first fuel injector and a second gaseous outlet of the second fuel injector are each located a second radial distance from the engine axis; and wherein the first radial distance is equal to the second radial distance.

* * * * *